United States Patent [19]
Lin et al.

[11] Patent Number: 6,114,782
[45] Date of Patent: Sep. 5, 2000

[54] TWO-PHASE HYBRID STEP MOTOR DRIVEN BY THREE-PHASE DRIVER

[76] Inventors: Ted T. Lin; Ryan C. Lin, both of 12307 Crayside La., Saratoga, Calif. 95070

[21] Appl. No.: 09/410,495

[22] Filed: Sep. 30, 1999

[51] Int. Cl.[7] .............................. H02K 37/00; H02K 1/00; H02K 3/00; H02K 19/26; H02K 17/00
[52] U.S. Cl. ...................... 310/49 R; 310/179; 310/180; 310/184; 310/189; 310/200; 318/696
[58] Field of Search .................................. 310/49 R, 179, 310/180, 184, 189, 200; 318/696

[56] References Cited

U.S. PATENT DOCUMENTS

| | | | |
|---|---|---|---|
| 3,466,518 | 9/1969 | Aylikci et al. | 318/685 |
| 3,629,636 | 12/1971 | Hill | 310/184 |
| 4,638,195 | 1/1987 | Lin | 310/49 R |
| 4,733,113 | 3/1988 | Smith | 310/49 R |
| 4,792,709 | 12/1988 | Smith et al. | 310/49 R |
| 5,406,185 | 4/1995 | Strunk | 318/767 |
| 5,444,316 | 8/1995 | Ohya et al. | 310/49 R |
| 5,689,167 | 11/1997 | Vitunic | 318/767 |

*Primary Examiner*—Nestor Ramirez
*Assistant Examiner*—Guillermo Perez
*Attorney, Agent, or Firm*—Thomas Schneck

[57] ABSTRACT

Disclosed is a stator of 2-phase step motor that has 4 stator coils, two in each phase. The coils are wound around 8 stator poles in a standard bifilar winding pattern. The first center-tap of the first phase and the second center tap of the second phase are connected. One end of the first phase makes a first terminal. One end of the second phase makes a second terminal. The other end of the first phase and the other end of the second phase are connected to make a third terminal. A three-phase driver can drive the step motor via these three terminals. Performance of the stator of the step motor can be improved by increasing the number of turns of the two coils whose ends make the first and second terminals. Then the three phase resistances of the stator can be adjusted to have similar resistances by reducing the wire gauge of the other two coils. This reduction of the wire size compensates for the space needed for the increase in the numbers of coil turns mentioned above. This connection scheme applies in general to a 4N-pole stator of a 2-phase step motor.

20 Claims, 8 Drawing Sheets

TWO-PHASE HYBRID STEP MOTOR DRIVEN BY THREE-PHASE DRIVER

TECHNICAL FIELD

The invention relates to stators for step motors, and more particularly to a step motor's stator that can be driven by a driver whose number of phases is different from that of the stator.

BACKGROUND ART

Figure 1A:
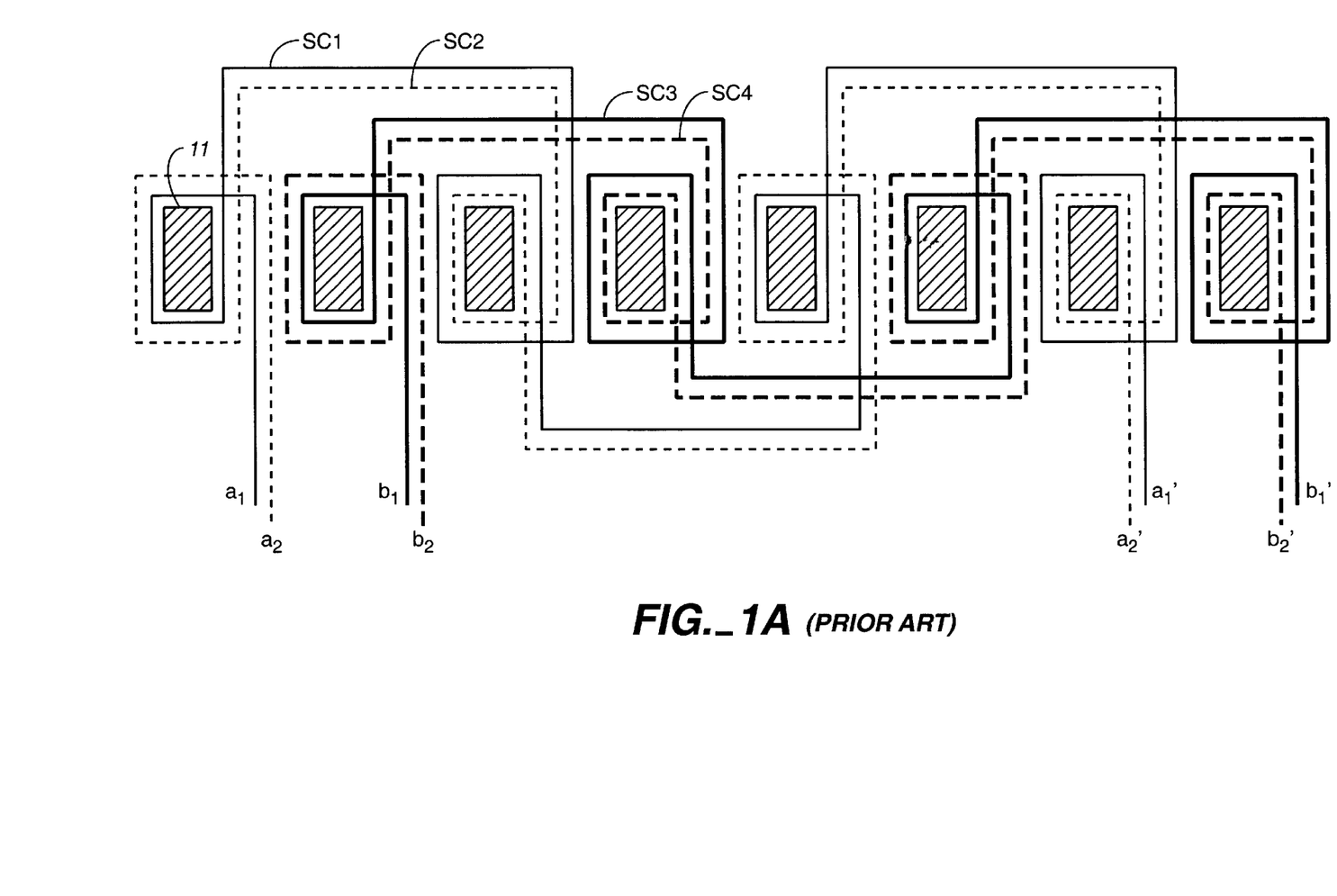
FIG. 1A shows a typical bifilar winding diagram for a typical eight-pole stator of a two-phase step motor of the prior art.
Figure 1B:
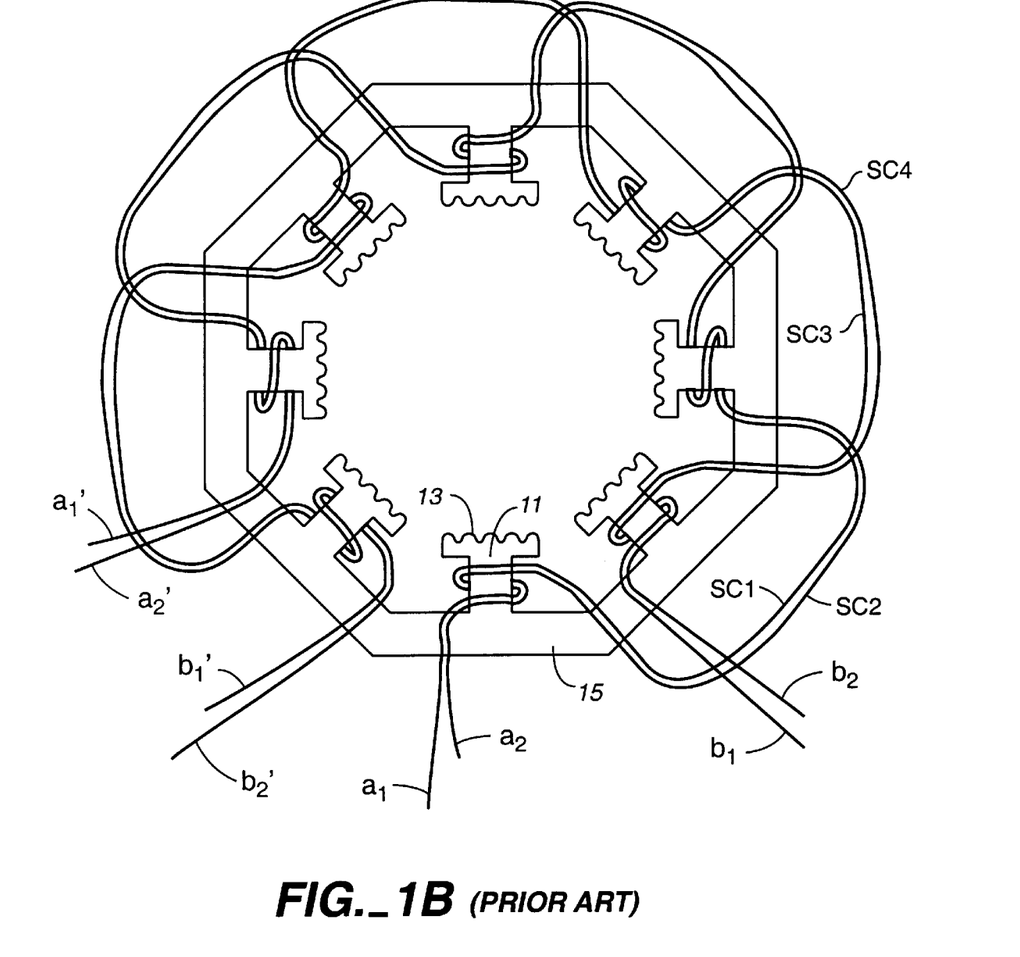
FIG. 1B is a top elevational view of the stator in FIG. 1A.

Two-phase step motors have been very popular in the motion control industry. With reference to FIGS. 1A and 1B, only the stator poles and coils of such a motor of the prior art are shown. The rotor is not shown. In actual implementation, the rotor will appear as a multi-tooth gear and the stator poles will have corresponding teeth so as to permit many motor steps per revolution. As shown in FIG. 1B, stator 15 has eight stator poles 11. Each stator pole 11 has a plurality of teeth 13. The first, second, third, and fourth stator coils are respectively labeled $a_1 a_1'$, $a_2 a_2'$, $b_1 b_1'$, and $b_2 b_2'$, or in alternative, SC1, SC2, SC3, and SC4, respectively. The first and second stator coils SC1 and SC2 are paired (bifilar) throughout the winding. The third and fourth stator coils SC3 and SC4 are also paired (bifilar) throughout the winding. These four stator coils are wound around the eight stator poles 11. The term "stator coil" used in this application refers to an electric wire wound around one or more poles 11 of the stator in a specified manner. As shown in FIG. 1A, each stator coil is a wire wound around four stator poles in alternating direction: counterclockwise and clockwise. Each stator coil is wound around every other stator pole 11. "Bifilar" winding pattern means that the stator coils are wound around the stator poles in pairs.

Figure 1C:
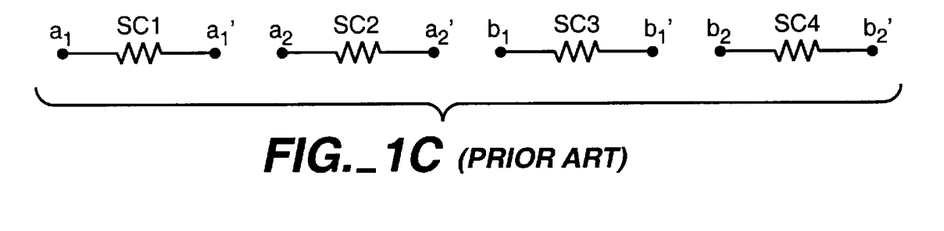
FIG. 1C is the circuit diagram for the stator in FIG. 1A.
Figure 2:
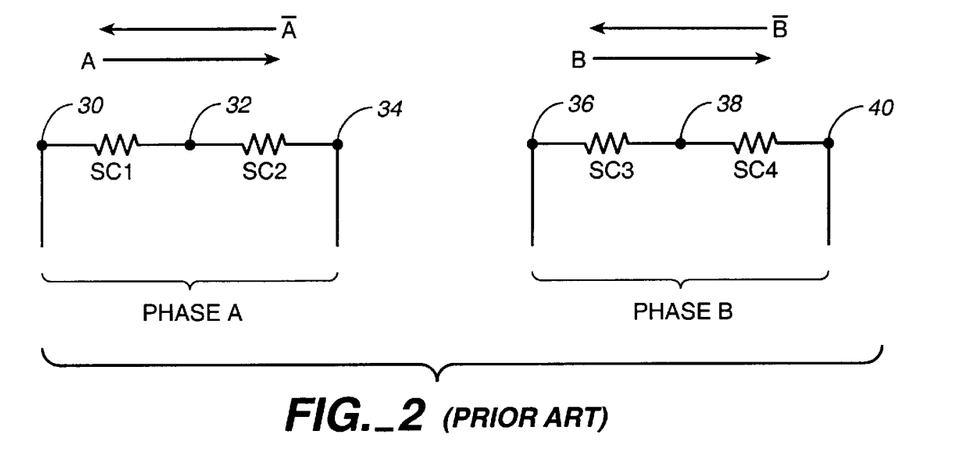
FIG. 2 shows the electrical connection diagram of the typical two-phase stator in FIG. 1A.

FIG. 1C shows the circuit diagram and FIG. 2 shows the electrical connection diagram for the typical two-phase 8-stator pole stator in FIG. 1A. With reference to FIGS. 1C and 2, the end $a_1$ of the first stator coil SC1 in FIG. 1C forms the terminal 30 in FIG. 2. The end $a_1'$ of the first stator coil SC1 and the end $a_2$ of the second stator coil SC2 in FIG. 1C are connected to form a center-tap 32 in FIG. 2. The end $a_2'$ of the second stator coil SC2 in FIG. 1C forms the terminal 34 in FIG. 2. Similarly, the end $b_1$ of the third stator coil SC3 in FIG. 1C forms the terminal 36 in FIG. 2. The end $b_1'$ of the third stator coil SC3 and the end $b_2$ of the fourth stator coil SC4 in FIG. 1C are connected to form another center-tap 38 in FIG. 2. The end $b_2'$ of the fourth stator coil SC4 in FIG. 1C forms the terminal 40 in FIG. 2. Terminals 30 and 34 connect to phase A of a two-phase driver. Terminals 36 and 40 connect to phase B of the two-phase driver. Phases A and B of the two-phase stator have a 90° phase shift from each other. A reversed current through phase A (the first and second stator coils SC1 and SC2) having a 180° phase shift from phase A is designated as phase $\overline{A}$. A reversed current through phase B (the third and fourth stator coils SC3 and SC4) having a 180° phase shift from phase B is designated as phase $\overline{B}$.

The number of mechanical phases are two times the number of electrical phases in a bipolar device. The step resolution (the number of steps per revolution) of a step motor is determined by multiplying the number of rotor teeth by the number of mechanical phases.

An object of the present invention is to provide a connection scheme for a two-phase stator of a step motor so that the motor can be run more smoothly and with higher resolution (higher number of steps per revolution) by a three-phase driver.

SUMMARY OF THE INVENTION

The present invention achieves the stated objective by using a special connection scheme for the stator of a two-phase step motor whose stator coils are wound in a standard bifilar winding pattern so that the stator can be driven by a three-phase driver. With the same number of rotor teeth, the two-phase step motor would have 50% higher resolution by using a three-phase driver rather than a two-phase driver. In general, this special connection scheme can be used for any 4N pole two-phase stator. The two-phase stator has four stator coils wound around 4N stator poles. Each of the two phases has two stator coils. A first center-tap connecting the coils of the first phase and a second center-tap connecting the coils of the second phase are connected together. One end of the first phase forms a first terminal. One end of the second phase forms a second terminal. The other end of the first phase and the other end of the second phase are connected to form a third terminal. A three-phase driver can drive the step motor via the first, second, and third terminals.

BEST MODE FOR CARRYING OUT THE INVENTION

Figure 3:
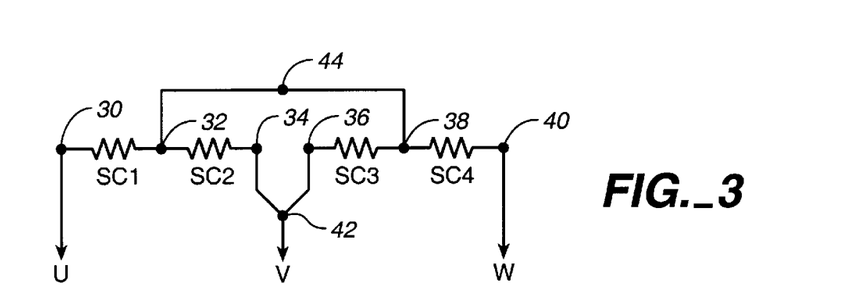
FIG. 3 is an electrical circuit diagram for one embodiment of a stator of the present invention to be used by a three-phase driver.

With reference to FIG. 3, two center-taps 32 and 38 are connected together to a common terminal 44. Terminal 30 connects to the first phase U of the three-phase driver; terminal 40 connects to the second phase W of the three-phase driver; and terminals 34 and 36 connect to a common terminal 42 which in turn connects to the third phase V of the three-phase driver.

Figure 4:
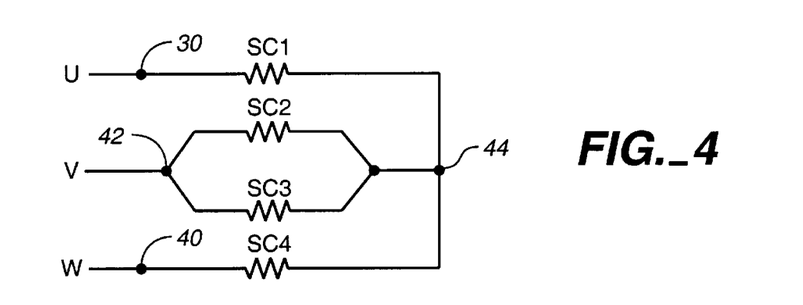
FIG. 4 is an alternative view of the electrical circuit diagram in FIG. 3.

With reference to FIG. 4, the circuit diagram in FIG. 3 is rearranged for better understanding of later analysis. The connection scheme in the previous paragraph can be described in another way: the second and third stator coils SC2 and SC3 are removed electrically from phase A and phase B as shown in FIG. 2, respectively, to form a third phase V, as shown in FIG. 4. There is no physical movement of the stator coils. With this special connection scheme, the step motor's stator when driven by a 3-phase driver will generate a revolving magnetic field similar to that generated by a 3-phase stator driven by a 3-phase driver as will be explained in the following section.

Figure 5A:
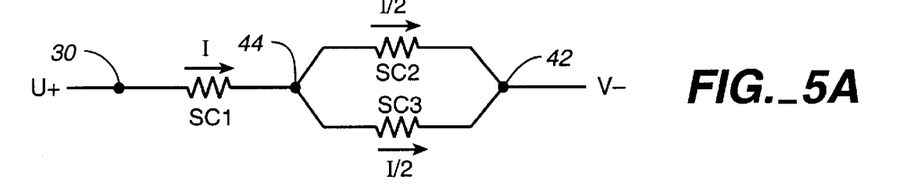
FIG. 5A shows the electrically equivalent circuit of the circuit in FIG. 4 when it is energized by U+V−, i.e. phase U is positive, phase V is negative, and phase W is zero.

With reference to FIG. 5A, each stator coil (SC1, SC2, SC3, and SC4) has the same number of turns with the same wire size. Current I flows through the first stator coil SC1 splitting in half (I/2) through the second stator coil SC2 and the third stator coil SC3. Let $\hat{A}$ and $\hat{\bar{A}}$ denote the unit vectors representing the magnetic fields generated by phases A and $\bar{A}$, respectively as in FIG. 2. Let $\hat{B}$ and $\hat{\bar{B}}$ denote unit vectors representing the magnetic fields generated by phases B and $\bar{B}$, respectively as in FIG. 2. The magnitude of each magnetic field generated by a stator coil is determined by the current I through the coil times the number of turns N of the coil, which is designated as Ampere-Turns, IN. The motor magnetic field $P_1$ is the vector sum of the magnetic fields generated by the first, second, and third stator coils SC1, SC2, and SC3.

$$P_1 = IN\ \hat{A} + (I/2)N\ \hat{A} + (I/2)N\hat{B} = 1.5\ IN\ \hat{A} + 0.5\ IN\hat{B}$$

Because $\hat{A}$ and $\hat{B}$ are perpendicular, the magnitude of the resultant magnetic field vector $P_1$ is $$|P_1| = \sqrt{0.5^2 + 1.5^2}\ IN = 1.581\ IN$$

Figure 5B:
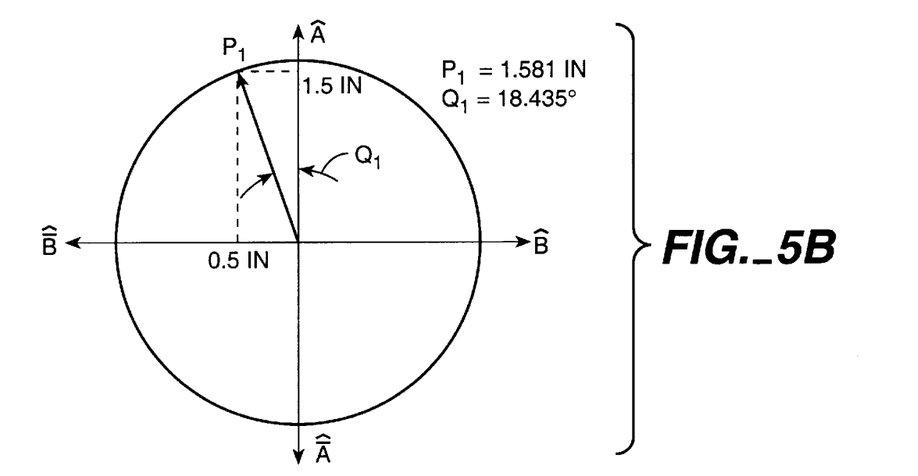
FIG. 5B shows the resultant magnetic field vector $P_1$ when U+V− energizes the circuit in FIG. 4, with $N_{SC1}=N_{SC2}=N_{SC3}=N_{SC4}$, $N_{SCi}$ (i=1 to 4) is the number of turns of the $i^{th}$ stator coil in FIG. 4.

The phase of the resultant magnetic field vector $P_1$ can be determined as shown in FIG. 5B as follows:

$$Q1 = \tan^{-1}(0.5/1.5) = 18.435°$$

As shown in FIG. 5B, the phase angle of the resultant magnetic field $P_1$ shifts from $\hat{A}$ direction by Q1=18.435°.

Figure 6A:
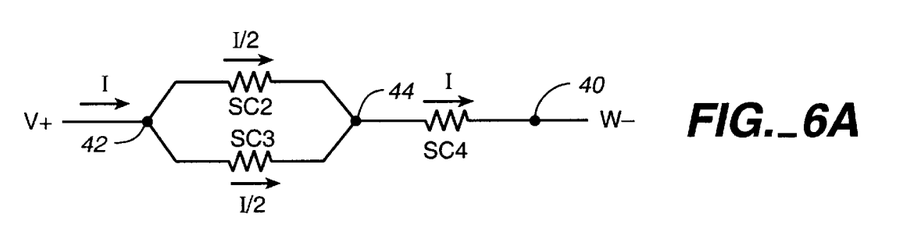
FIG. 6A shows the electrically equivalent circuit of the circuit in FIG. 4 when it is energized by V+W−, i.e. phase V is positive, phase W is negative, and phase U is zero.

Similarly, with reference to FIG. 6A, the motor magnetic field $P_3$ is the vector sum of the magnetic fields generated by the second, third, and fourth stator coils SC2, SC3, and SC4.

$$P_3 = (I/2)N\hat{\bar{A}} + (I/2)N\ \hat{B} + IN\ \hat{B} = 0.5\ IN\hat{\bar{A}} + 1.5\ IN\ \hat{B}$$

Because $\hat{A}$ and $\hat{B}$ are perpendicular, the magnitude of the resultant magnetic field vector $P_3$ is $$|P_3| = \sqrt{0.5^2 + 1.5^2}\ IN = 1.581\ IN$$

Figure 6B:
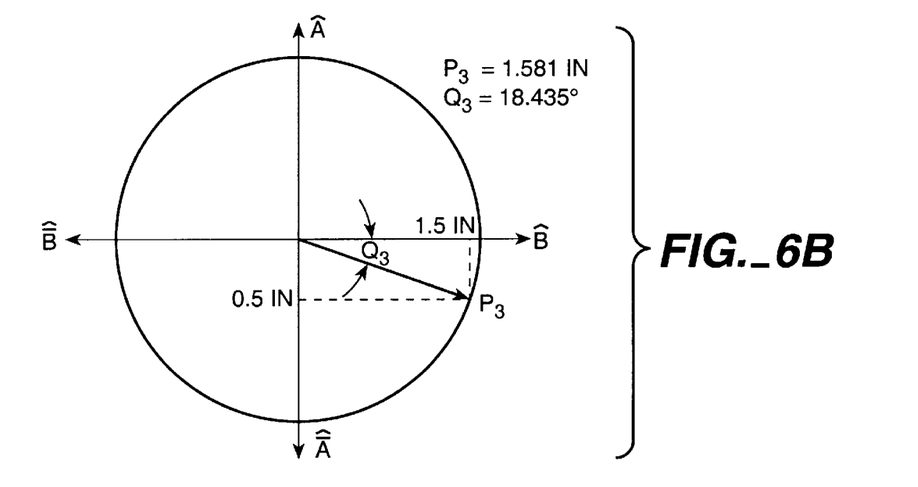
FIG. 6B shows the resultant magnetic field vector $P_3$ when V+W− energizes the circuit in FIG. 4, with $N_{SC1}=N_{SC2}=N_{SC3}=N_{SC4}$.

The phase of the resultant magnetic field vector $P_3$ can be determined as shown in FIG. 6B as follows:

$$Q3 = \tan^{-1}(0.5/1.5) = 18.435°$$

As shown in FIG. 6B, the phase angle of the resultant magnetic field $P_3$ shifts from the $\hat{B}$ direction by Q3=18.435°.

Figure 7A:
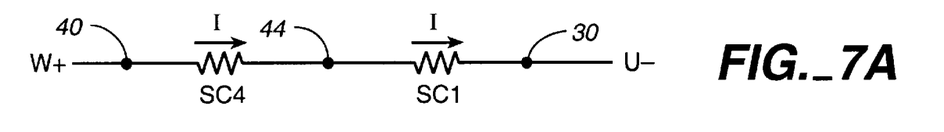
FIG. 7A shows the electrically equivalent circuit of the circuit in FIG. 4 when it is energized by W+U−, i.e. phase W is positive, phase U is negative, and phase V is zero.

Similarly, with reference to FIG. 7A, the motor magnetic field $P_5$ is the vector sum of the magnetic fields generated by the fourth and first stator coils SC4 and SC1.

$$P_5 = IN\hat{B} + IN\hat{\bar{A}}$$

Because $\hat{A}$ and $\hat{B}$ are perpendicular, the magnitude of the resultant magnetic field vector $P_5$ is $$|P_5| = \sqrt{1^2 + 1^2}\ IN = 1.414\ IN$$

Figure 7B:
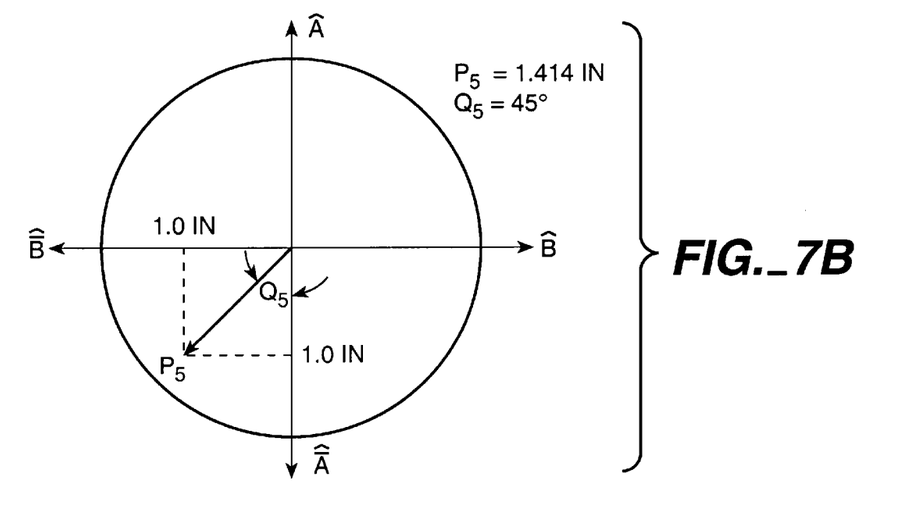
FIG. 7B shows the resultant magnetic field vector $P_5$ when V+W− energizes the circuit in FIG. 4, with $N_{SC1}=N_{SC2}=N_{SC3}=N_{SC4}$.

The phase of the resultant magnetic field vector $P_5$ can be determined as shown in FIG. 7B as follows:

$$Q5 = \tan^{-1}(1/1) = 45°$$

As shown in FIG. 7B, the phase angle of the resultant magnetic field $P_5$ shifts from the $\hat{\bar{A}}$ direction by Q5=45°.

Figure 8:
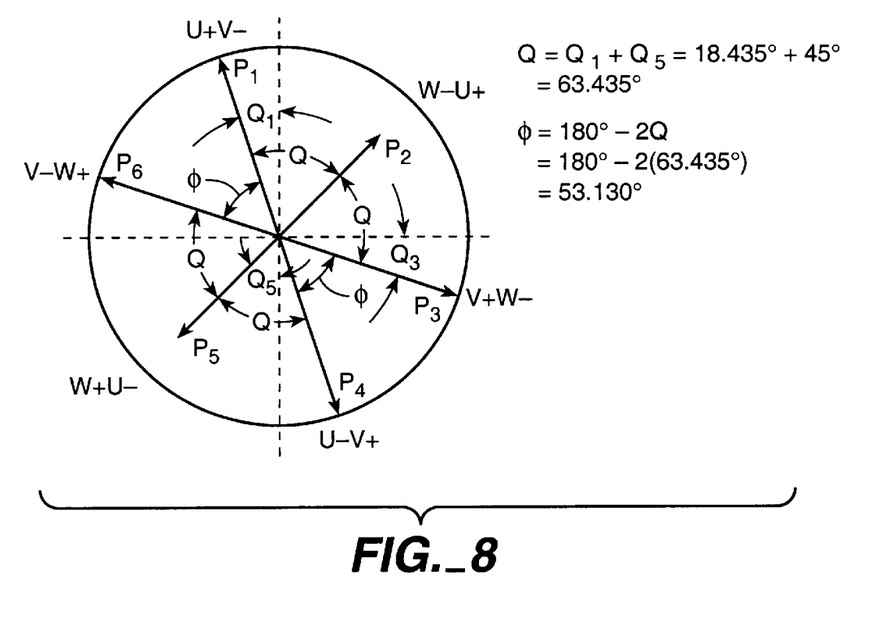
FIG. 8 shows the resultant magnetic field vector $P_i$ (i=1 to 6) when U+V−, W−U+, V+W−, U−V+, W+U−, and V−W+ energize the circuit in FIG. 4, respectively, with $N_{SC1}=N_{SC2}=N_{SC3}=N_{SC4}$.

Similarly, when W−U+, U−V+, or V−W+ energizes the motor, the corresponding resultant magnetic fields $P_2$, $P_4$, and $P_6$, respectively, can be illustrated as shown in FIG. 8.

With reference to FIG. 8, the step sequence will be U+V− ($P_1$), W−U+ ($P_2$), V+W− ($P_3$), U−V+ ($P_4$), W+U− ($P_5$), and V−W+ ($P_6$). The angles between $P_1$ and $P_2$, $P_2$ and $P_3$, $P_4$ and $P_5$, $P_5$ and $P_6$ are the same (Q=63.435°>60°). The angles between $P_3$ and $P_4$, $P_6$ and $P_1$ are the same (φ=53.130°<60°). The magnitude of the resultant magnetic fields are $P_1=P_3=P_4=P_6=1.581$ IN, $P_2=P_5=1.414$ IN, as calculated in FIGS. 5A, 6A, and 7A, where I is a current as shown in FIGS. 5A, 6A, and 7A; and N is the number of turns of the four stator coils SC1, SC2, SC3, and SC4.

Performance of the stator of the step motor in the present invention can be improved by increasing the number of turns of the first and fourth stator coils SC1 and SC4 by 36.6% to overcome the uneven vectors $P_i$ (i=1 to 6) and non-identical angular steps, as shown in the following.

Figure 9A:
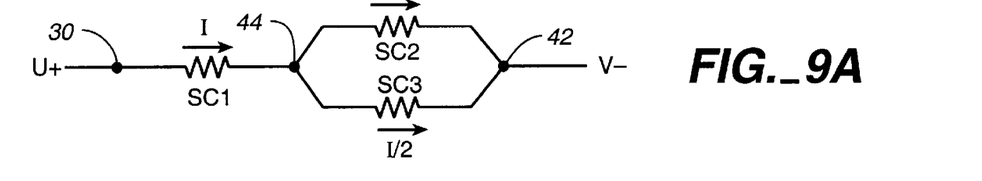
FIG. 9A shows the electrically equivalent circuit of the circuit in FIG. 4 when it is energized by U+V−, with $N_{SC1}=1.366\ N_{SC2}=1.366\ N_{SC3}=N_{SC4}$, where $N_{SCi}$ (i=1 to 4) is the number of turns of the $i^{th}$ stator coil in FIG. 4.

With reference to FIG. 9A, the motor magnetic field $T_1$ is the vector sum of the magnetic fields generated by the first, second, and third stator coils SC1, SC2, and SC3.

$$T_1 = 1.366\ IN\ \hat{A} + (I/2)N\ \hat{A} + (I/2)N\hat{B} = 1.866\ IN\ \hat{A} + 0.5\ IN\hat{B}$$

Because $\hat{A}$ and $\hat{B}$ are perpendicular, the magnitude of the resultant magnetic field vector $T_1$ is:

$$|T_1| = \sqrt{1.866^2 + 0.5^2}\ IN = 1.9318\ IN$$

Figure 9B:
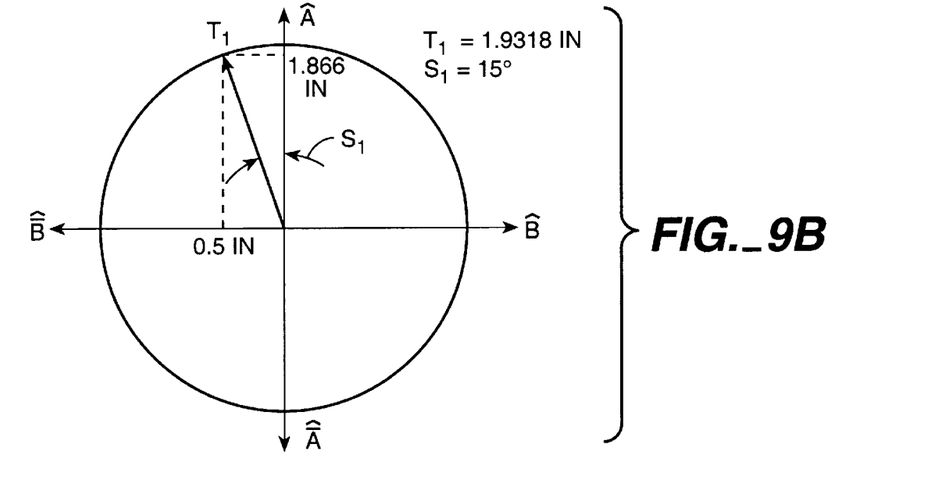
FIG. 9B shows the resultant magnetic field vector $T_1$ when U+V− energizes the circuit in FIG. 4, with $N_{SC1}=1.366\ N_{SC2}=1.366\ N_{SC3}=N_{SC4}$.

The phase of the resultant magnetic field vector $T_1$ can be determined as shown in FIG. 9B as follows:

$$S1 = \tan^{-1}(0.5/1.866) = 15°$$

As shown in FIG. 9B, the phase angle of the resultant magnetic field $T_1$ shifts from $\hat{A}$ direction by $S1=15°$.

Figure 10A:
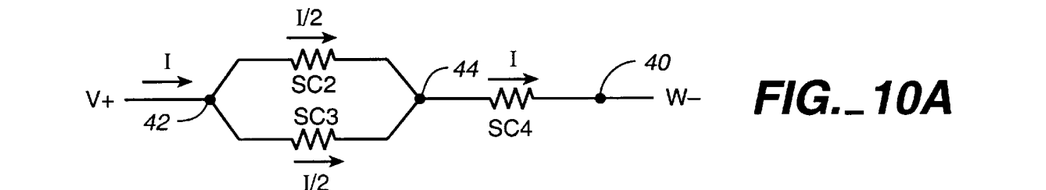
FIG. 10A shows the electrically equivalent circuit of the circuit in FIG. 4 when it is energized by V+W−, with $N_{SC1}=1.366\ N_{SC2}=1.366\ N_{SC3}=N_{SC4}$.

Similarly, with reference to FIG. 10A, the motor magnetic field $T_3$ is the vector sum of the magnetic fields generated by the second, third, and fourth stator coils SC2, SC3, and SC4.

$$T_3 = (I/2)N\hat{A} + (I/2)N\ \hat{B} + 1.366\ IN\ \hat{B} = 0.5\ IN\hat{A} + 1.866\ IN\ \hat{B}$$

Because $\hat{A}$ and $\hat{B}$ are perpendicular, the magnitude of the resultant magnetic field vector $T_3$ is $$|T_3| = \sqrt{0.5^2 + 1.866^2}\ IN = 1.9318\ IN$$

Figure 10B:
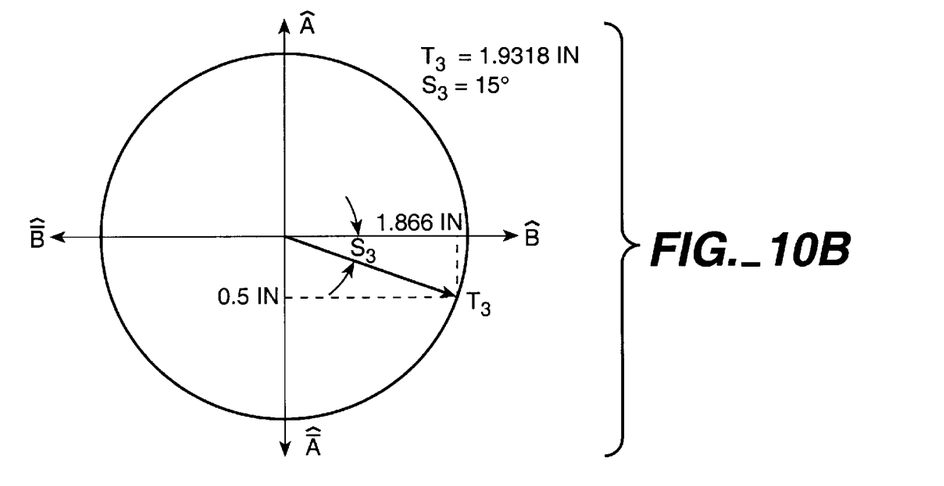
FIG. 10B shows the resultant magnetic field vector $T_3$ when V+W− energizes the circuit in FIG. 4, with $N_{SC1}=1.366\ N_{SC2}=1.366\ N_{SC3}=N_{SC4}$.

The phase of the resultant magnetic field vector $T_3$ can be determined as shown in FIG. 10B as follows:
$$S3 = \tan^{-1}(0.5/1.866) = 15°$$

As shown in FIG. 10B, the phase angle of the resultant magnetic field $T_3$ shifts from the $\hat{B}$ direction by $S3=15°$.

Figure 11A:
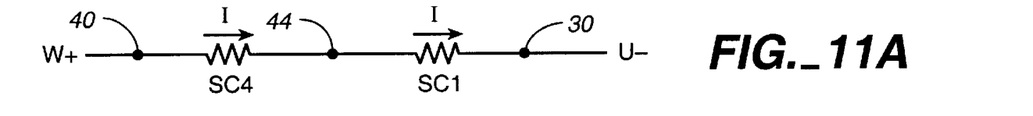
FIG. 11A shows the electrically equivalent circuit of the circuit in FIG. 4 when it is energized by W+U−, with $N_{SC1}=1.366\ N_{SC2}=1.366\ N_{SC3}=N_{SC4}$.

Similarly, with reference to FIG. 11A, the motor magnetic field $S_5$ is the vector sum of the magnetic fields generated by the fourth and first stator coils SC4 and SC1.

$$T_5 = 1.366\ IN\hat{B} + 1.366\ IN\hat{A}$$

Because $\hat{A}$ and $\hat{B}$ are perpendicular, the magnitude of the resultant magnetic field vector $T_5$ is $$|T_5| = \sqrt{1.366^2 + 1.366^2}\ IN = 1.9318\ IN$$

Figure 11B:
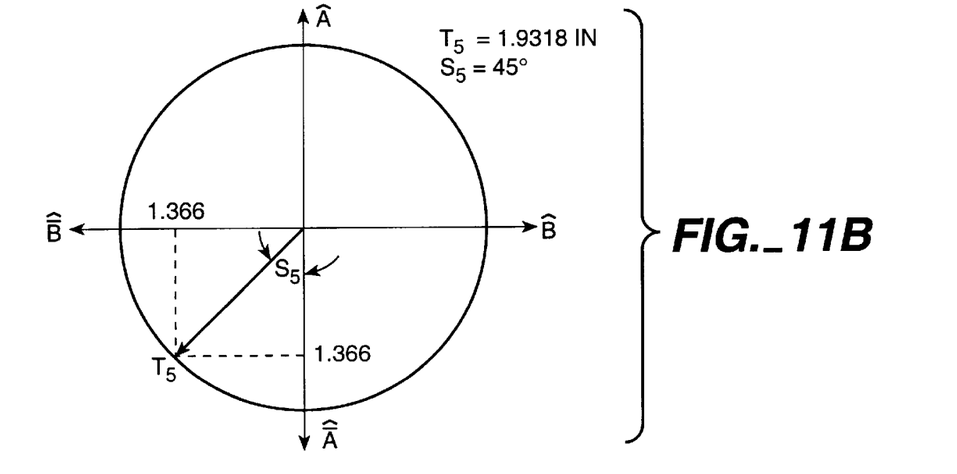
FIG. 11B shows the resultant magnetic field vector $T_5$ when W+U− energizes the circuit in FIG. 4, with $N_{SC1}=1.366\ N_{SC2}=1.366\ N_{SC3}=N_{SC4}$.

The phase of the resultant magnetic field vector $T_5$ can be determined as shown in FIG. 11B as follows:

$$S5 = \tan^{-1}(1.366/1.366) = 45°$$

As shown in FIG. 11B, the phase angle of the resultant magnetic field $T_5$ shifts from the $\overline{A}$ direction by $S5=45°$.

Similarly, when W–U+, U–V+, or V–W+ energizes the motor, the corresponding resultant magnetic fields $T_2$, $T_4$, and $T_6$, respectively, can be calculated. The calculation results are shown in FIG. 12.

Figure 12:
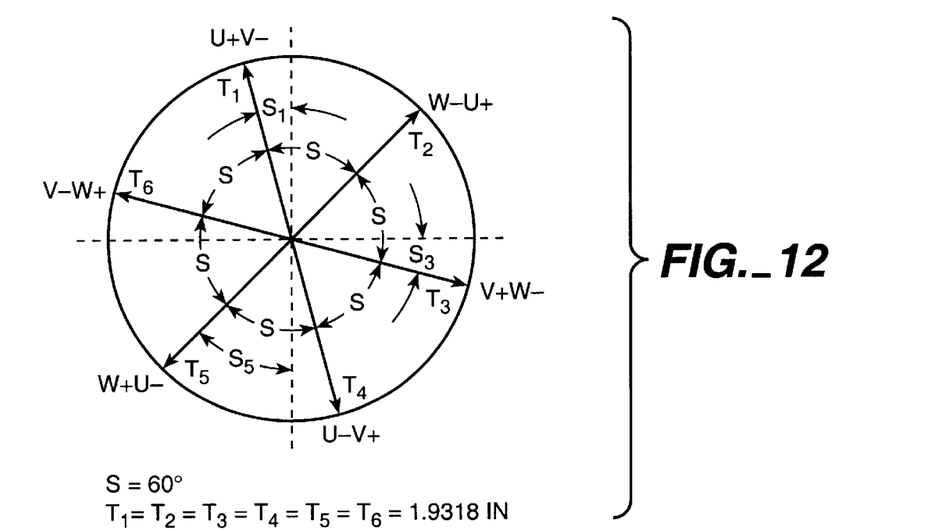
FIG. 12 shows the resultant magnetic field vector $T_i$ (i=1 to 6) when U+V−, W−U+, V+W−, U−V+, W+U−, and V−W+ energize the circuit in FIG. 4, respectively, with $N_{SC1}=1.366\ N_{SC2}=1.366\ N_{SC3}=N_{SC4}$.

With reference to FIG. 12, the step sequence will be U+V– ($T_1$), W–U+ ($T_2$), V+W– ($T_3$), U–V+ ($T_4$), W+U– ($T_5$), and V–W+ ($T_6$). The angles between $T_1$ and $T_2$, $T_2$ and $T_3$, $T_3$ and $T_4$, $T_4$ and $T_5$, $T_5$ and $T_6$, and $T_6$ and $T_1$ are all the same (S=60°). The magnitude of the resultant magnetic fields now are identical $T_1=T_2=T_3=T_4=T_5=T_6=1.9318\ IN$, as calculated in FIGS. 9A, 10A, and 11A, where I is a current as shown in FIGS. 9A, 10A, and 11A; and N is the original number of turns of the four stator coils SC1, SC2, SC3, and SC4.

The same improvement can also be achieved by reducing the number of turns of the second and third stator coils SC2 and SC3. Also, a combination of increasing the number of turns of the first and fourth stator coils SC1 and SC4 and reducing the number of turns of the second and third stator coils SC2 and SC3 would yield the same improvement. The amount of reduction or increase in the number of turns can be calculated in the like manners described above.

The phase resistances of the step motor in the present invention can be adjusted to be very close to one another by reducing the wire size of the second and third stator coils SC2 and SC3 by 4 AWG, and thereby increasing their resistances to 2.52 times their original values. In other words, the increased resistance of the second and third stator coils SC2 and SC3 is 1.844 (=2.52/1.366) times that of the first and fourth stator coils SC1 and SC4. This reduction of wire size of the second and third stator coils SC2 and SC3 also saves space for increasing the numbers of turns of the first and fourth stator coils SC1 and SC4 by 36.6% as disclosed above.

Figure 13:
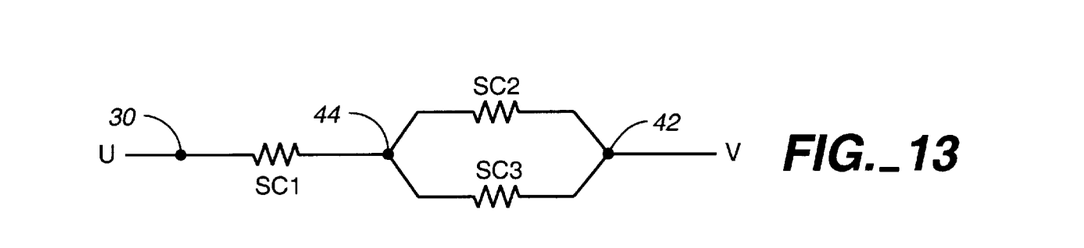
FIG. 13 shows the equivalent circuit of the circuit in FIG. 4 for the calculation of the UV phase resistance $R_{UV}$ (defined as the resistance of the circuit in FIG. 4 when U+V− or U−V+ energizes it), with $N_{SC1}=1.366\ N_{SC2}=1.366\ N_{SC3}=N_{SC4}$, and $1.844\ R_{SC1}=R_{SC2}=R_{SC3}=1.844\ R_{SC4}$, where $R_{SCi}$ (i=1 to 4) denotes the resistance of the $i^{th}$ stator coil in FIG. 4.

With reference to FIG. 13, assuming the original coil winding resistance is R, the resistances of the second and third stator coils SC2 and SC3 after the increase will be 2.52 R. Because the second and third stator coils SC2 and SC3 are in parallel with each other and both are in series with the first stator coil SC1, the total phase resistance $R_{UV}$ is:
$R_{UV} = R_{SC1} + R_{SC2}||R_{SC3} = 1.366R + (2.52/2)R = 2.626R$ where $R_{SC2}||R_{SC3}$ denotes the equivalent resistance of the second and third stator coils in parallel.

Figure 14:
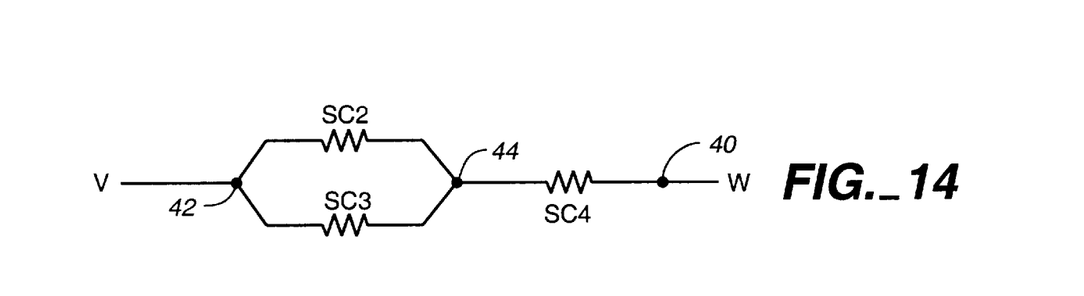
FIG. 14 shows the equivalent circuit of the circuit in FIG. 4 for the calculation of the VW phase resistance $R_{VW}$ (defined as the resistance of the circuit in FIG. 4 when V+W− or V−W+ energizes it), with $N_{SC1}=1.366\ N_{SC2}=1.366\ N_{SC3}=N_{SC4}$, and $1.844\ R_{SC1}=R_{SC2}=R_{SC3}=1.844\ R_{SC4}$.

Similarly, with reference to FIG. 14, because the second and third stator coils SC2 and SC3 are in parallel with each other and both are in series with the fourth stator coil SC4, the total phase resistance $R_{VW}$ is:

$$R_{VW} = R_{SC2}||R_{SC3} + R_{SC4} = (2.52/2)R + 1.366R = 2.626R$$

Figure 15:
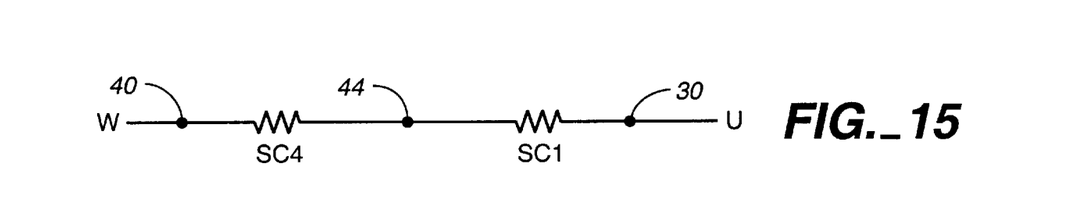
FIG. 15 shows the equivalent circuit of the circuit in FIG. 4 for the calculation of the WU phase resistance $R_{WU}$ (defined as the resistance of the circuit in FIG. 4 when W+U− or W−U+ energizes it), with $N_{SC1}=1.366\ N_{SC2}=1.366\ N_{SC3}=N_{SC4}$, and $1.844\ R_{SC1}=R_{SC2}=R_{SC3}=1.844\ R_{SC4}$.

Similarly, with reference to FIG. 15, because the fourth and first stator coils SC4 and SC1 are in series, the total phase resistance $R_{WU}$ is:

$$R_{WU} = R_{SC4} + R_{SC1} = 1.366R + 1.366R = 2.732R$$

So, $R_{UV} = R_{VW} = 2.626$ R and $R_{WU} = 2.732$ R.
Therefore, $R_{UV} = R_{VW} \approx R_{WU}$.

Although an eight-pole stator is used for illustrating the connection scheme, the described connection scheme applies to any 2-phase stator of a step motor having 4N stator poles so that the motor can be driven by a 3-phase driver.

Also, the method of electrically grouping stator coils from the original two phases of a two-phase step motor to form a third phase may be applied to any two-phase step motor, regardless of the number of stator poles in that step motor.

What is claimed is:

1. A step motor adapted to be driven by a three-phase driver, comprising:

a two-phase bifilar winding stator having a first and second sets of stator coils corresponding to the two phases of said stator; and a rotor magnetically interacting with said stator;

wherein at least one stator coil from said first set of stator coils and at least one stator coil from said second set of stator coils are electrically regrouped to form a third set of stator coils, the remaining stator coils of said first set of stator coils form a fourth set of stator coils and are connected to a first phase of said three-phase driver, the remaining stator coils of said second set of stator coils form a fifth set of stator coils and are connected to a second phase of said three-phase driver, the stator coils of said third set of stator coils are connected to a third phase of said three-phase driver.

2. The step motor of claim 1 wherein each of the first, second and third phases have a phase resistance and wherein a wire size of the stator coils of said third set of stator coils is selected such that the three phase resistances are substantially the same.

3. The step motor of claim 1 wherein a number of turns of the stator coils of each of said third, fourth, and fifth sets of stator coils are selected such that the magnetic field generated by said stator, when driven by said three-phase driver, revolves in six identical angular steps over a 360° revolution.

4. The step motor of claim 1 wherein said third set of stator coils has two stator coils, said fourth set of stator coils has one stator coil, said fifth set of stator coils has one stator coil.

5. The step motor of claim 4 wherein the stator coils of said fourth and fifth sets of stator coils have the same number of turns, K1, the stator coils of said third set of stator coils have the same number of turns, K2, and K1 is in a range from 1 to 2 times K2.

6. The step motor of claim 5 wherein the stator coils of said third set of stator coils have the same resistance R3, the stator coils of said fourth and fifth sets of stator coils have the same resistance R4, and R3 is in a range from 1 to 2 times R4.

7. A step motor comprising:
a 4N-pole two-phase bifilar winding stator having first, second, and third electrodes for connecting to a three-phase driver;
a first set of stator coils including a first stator coil having a first and second end and a second stator coil having a third and fourth end, said first and second stator coils being in pair and being wound around a first half of said 4N poles in a standard bifilar winding pattern, said second end and said third end being connected via a first center-tap such that said first and second stator coils are electrically in series in said first set of stator coils;
a second set of stator coils including a third stator coil having a fifth and sixth end and a fourth stator coil having a seventh and eighth end, said third and fourth stator coils being in pair and being wound around a second half of said 4N poles in a standard bifilar winding pattern, said sixth end and said seventh end being connected via a second center-tap such that said third and fourth stator coils are electrically in series in said second set of stator coils;
said first center-tap being connected to said second center-tap, said first end of said first stator coil being connected to said first electrode, said fourth end of said second stator coil and said fifth end of said third stator coil being both connected to said second electrode, said eighth end of said fourth stator coil being connected to said third electrode; and a rotor magnetically interacting with said stator, wherein said first and second sets of stator coils correspond to the two phases of said 4N-pole two-phase bifilar winding stator.

8. The step motor of claim 7 wherein the wire size of said second and third stator coils is selected such that the phase resistances between said first and second electrodes, and between said second and third electrodes, and between said third and first electrodes are substantially the same.

9. The step motor of claim 7 wherein a number of turns of each of said stator coils are selected such that the resultant magnetic field will revolve in six identical angular steps over a 360° revolution when said three-phase driver drives said stator via said first, second, and third electrodes in a six step sequence.

10. The step motor of claim 7 wherein said first and fourth stator coils have the same number of turns, N1, said second and third stator coils have the same number of turns, N2, and N1 is in a range from 1 to 2 times N2.

11. The step motor of claim 10 wherein said second and third stator coils have the same resistance, R1, said first and fourth stator coils have the same resistance, R2, and R1 is in a range from 1 to 2 times R2.

12. The step motor of claim 7 wherein said first, second, third, and fourth stator coils have the same wire size.

13. The step motor of claim 7 wherein all of said stator coils have the same number of turns.

14. A method of coupling a 4N-pole two-phase bifilar winding stator to a three-phase driver, comprising:
providing a 4N-pole two-phase bifilar winding stator having a first and second sets of stator coils corresponding to the two phases of said stator, said first set of stator coils having a first and second stator coils in pair, said second set of stator coils having a third and fourth stator coils in pair;
connecting together said first and second stator coils of said stator via a first center-tap so that the first and second stator coils are electrically in series;
connecting together said third and fourth stator coils of said stator via a second center-tap so that the third and fourth stator coils are electrically in series;
connecting said first center-tap to said second center-tap;
connecting an unconnected end of said first stator coil to a first electrode of said three-phase driver;
connecting both an unconnected end of said second stator coil and the unconnected end of said third stator coil to a second electrode of said three-phase driver; and
connecting an unconnected end of said fourth stator coil to a third electrode of said three-phase driver.

15. The method of claim 14 further comprising selecting the wire size for said second and third stator coils such that the phase resistances between said first and second electrodes, between said second and third electrodes, and between said third and first electrodes are substantially the same.

16. The method of claim 14 further comprising selecting a number of turns for each of said stator coils such that the resultant magnetic field will revolve in six identical angular steps over a 360° revolution when said three-phase driver energizes said 4N-pole two-phase bifilar winding stator in a six step sequence.

17. The method of claim 14 further comprising:
using the same number of turns, M1, for said first and fourth stator coils; and
using the same number of turns, M2, for said second and third stator coils;

wherein M1 is in a range from 1 to 2 times M2.

18. The method of claim 17 further comprising:

using the same resistance, R5, for said second and third stator coils; and using the same resistance, R6, for said first and fourth stator coils;

wherein R5 is in a range from 1 to 2 times R6.

19. The method of claim 14 further comprising using the same wire size for all said stator coils.

20. The method of claim 19 further comprising using the same number of turns for said stator coils.

* * * * *

UNITED STATES PATENT AND TRADEMARK OFFICE
CERTIFICATE OF CORRECTION

PATENT NO. : 6,114,782
DATED : September 5, 2000
INVENTOR(S) : Ted T. Lin, et. al.

It is certified that error appears in the above-identified patent and that said Letters Patent is hereby corrected as shown below:

Column 2, line 42, "$N_{sc2}=N_{sc3}=N_{sc4}$, $N_{sci}$ (i=1 to 4)", should read ---$N_{sc2}=N_{sc3}=N_{sc4}$, where $N_{sci}$ (i=1 to 4)---.

Column 5, line 47, "$T_5$ 32 1.366 IN $\hat{\bar{B}}$ + 1.366 IN $\hat{\bar{A}}$"

should read ---$T_5=1.366$ IN $\hat{\bar{B}}$ + 1.366 IN $\hat{\bar{A}}$---.

Signed and Sealed this

First Day of May, 2001

*Attest:*

NICHOLAS P. GODICI

*Attesting Officer*     Acting Director of the United States Patent and Trademark Office